United States Patent Office 2,741,397
Patented Apr. 10, 1956

2,741,397

METAL FOOD AND BEVERAGE CONTAINER COATING COMPOSITION

James A. Shotton, Bartlesville, Okla., assignor to Phillips Petroleum Company, a corporation of Delaware No Drawing. Application June 30, 1952,
Serial No. 296,490

18 Claims. (Cl. 220—64)

This invention relates to containers for foods and beverages. In a further aspect this invention relates to a new composition for coating the surfaces of containers which are to be used for foods and beverages.

As is well known, foods and beverages destined for human consumption are frequently sold in metal containers. These containers, for the most part, are made of steel to which has been added a very thin coating of tin. Many foods and beverages contain acids and other materials which, upon standing, attack the base metal through this thin tin coating where there is the slightest imperfection in the tin, red and yellow vegetables being particularly corrosive. As a result the material in the container is rendered unfit for consumption.

In order to avoid the difficulties encountered with the use of these tin cans, it is common practice to apply a coating composition to the material which is to form the inside of the tin can. This material should be inert to the materials in the can and furthermore should not impart any odor or flavor to these materials. Where no coating of tin is used, it is absolutely necessary that some auxiliary coating be used.

Another property which is necessary for these coating materials is that of good adherence to the metal to which it is applied. This is necessary because the coating materials is usually applied before the container is fabricated. During fabrication the container will be subjected to a certain amount of bending and other mechanical working. A satisfactory coating composition will not be removed during these operations.

By the various aspects of this invention one or more of the following objects will be obtained.

An object of this invention is to prepare metal food and beverage containers which are suitable for storage of these materials for long periods of time. A further object of this invention is to provide containers for foods and beverages which contain corrosion preventing coatings prepared from hydroxylated conjugated diolefin polymers.

Upon reading this specification, additional objects and advantages of this invention will be apparent to one skilled in the art.

My invention comprises using hydroxylated conjugated diolefin polymers and various esters thereof as components in coating compositions to be used on metal surfaces, particularly surfaces that are to come in contact with various foods and beverages, such as meat, fruit, vegetables, beer, and the like, and more particularly the interior surfaces of metal containers that are to be used for the storage of foods and beverages. Hydroxylated conjugated diolefin polymers and/or esters thereof, such as esters of these hydroxylated polymers with unsaturated fatty acids containing from 12 to 24 carbon atoms per molecule or mixed unsaturated fatty acid-polybasic acid esters of these hydroxylated polymers, can be employed. In addition to the hydroxylated polymers or esters, the coating compositions also contain a drying or semi-drying oil. Suitable thinners are added to give varnish formulations of the desired consistency for application. Driers are also generally present. The varnish formulations thus obtained provide superior coatings for metal surfaces which have excellent covering power, adherence to the metal surface, heat resistance, and solvent resistance, and do not have a deleterious effect on the taste, color, or other properties of foods which come in contact with such coated metal surfaces.

In accordance with one embodiment of this invention, the coating compositions are produced from hydroxylated conjugated diolefin polymers (homopolymers or copolymers), such as hydroxylated polybutadiene, by mixing the hydroxylated polymers with glyceride oils, such as linseed oil, and heating the mixture at a temperature in the range between 400 and 650° F., preferably between 500 and 600° F., for a period usually not to exceed 10 hours and more frequently in the range between 2 and 6 hours, until a composition of the desired viscosity is obtained. It is generally preferred to agitate the mixture and to operate in an inert atmosphere such as nitrogen, carbon dioxide, or the like. An amount of hydroxylated conjugated diolefin polymer in the range from 2 to 90, preferably 5 to 50 per cent, based on the weight of the glyceride oil, is generally employed in these coating compositions. The production of these coating compositions is described more fully in a copending application of John C. Hillyer, Serial No. 297,165, filed July 3, 1952.

In accordance with another embodiment of this invention, coating compositions are produced by the interaction of a hydroxylated conjugated diolefin polymer (homopolymer or copolymer), such as hydroxylated polybutadiene, with an unsaturated fatty acid, such as a drying oil acid having from 12 to 24 carbon atoms per molecule. Linseed acids are frequently preferred for this esterification reaction. While it is generally preferred that esterification be effected in the presence of a drying oil or a relatively high boiling inert solvent or diluent as the esterification medium, it is not necessary that such a material be present.

One method for preparing these esterified compositions comprises heating a mixture of the drying oil or solvent, hydroxylated conjugated diolefin polymer, and acid at a temperature generally in the range between 200 and 600° F. The heating period will usually be in the range from 10 minutes to 24 hours depending upon the materials used and the temperature chosen. The acid number of the mixture (mg. KOH/g. sample) is generally not greater than 40 and is preferably less than 30, say around 25. The acid number of the esterified mixture is preferably around 20 or less and frequently around 5. A preferred method of operation is to add the fatty acid to the drying oil or solvent and warm the mixture if necessary to effect solution. The hydroxylated polymer such as hydroxylated polybutadiene is then introduced and esterification carried out at the desired temperature. An alternative procedure is to add the hydroxylated polymer to the drying oil and then add the acid. It is desirable to agitate the mixture and to operate in an inert atmosphere such as nitrogen, carbon dioxide, or the like.

The invention also utilizes other esterified compositions comprising mixed, unsaturated fatty acid-polybasic acid esters of hydroxylated conjugated diolefin polymers in drying oils. These mixed ester-drying oil compositions are produced by the interaction of hydroxylated polymeric material, such as hydroxylated polybutadiene, with an unsaturated fatty acid containing from 12 to 24 carbon atoms per molecule and a polybasic acid, such as dibasic acid, or the corresponding anhydride, either simultaneously or in two stages. While esterification can be effected in the absence of an esterification medium, it is generally preferred that a drying oil be present. Instead of a drying oil, a relatively high boiling inert solvent or diluent can be used. Methods of producing the esters and mixed esters of these hydroxylated conjugated diolefin polymers are described more fully in a copending application of Hutchinson and Bost, Serial No. 284,452, filed April 25, 1952.

In a preferred method of operation the unsaturated fatty acid is added to the drying oil and the mixture warmed if necessary to effect solution. Hydroxylated polymer is then introduced and esterification carried out at a temperature in the range between 200 and 600° F., preferably between 300 and 450° F. The acid number of the mixture (mg. KOH/g. sample), prior to esterification, is generally not greater than 40. Esterification is continued until the acid number drops to about 25 or less. The time required for esterification, at the reaction temperature, will usually be in the range from 10 minutes to 24 hours, and more frequently from 30 minutes to 3 hours depending upon the materials used and the temperature chosen. It is generally preferred that the temperature of the reaction mixture be around 200–300° F. before the polybasic acid or anhydride is added although this is not mandatory. If the first stage of the esterification has been carried out at a high temperature, the mixture is usually cooled prior to addition of the polybasic acid. After the polybasic acid or anhydride is added, esterification is effected at an elevated temperature such as a temperature in the range between 200 and 600° F., preferably 300 to 450° F., the time required for reaction being in the range between 10 minutes and 24 hours and more frequently from 30 minutes to 3 hours. Esterification is continued until the acid number of the resulting product has dropped to around 20 and generally lower, say around 5 to 10.

An alternative procedure for preparing these mixed esters is to charge the drying oil, hydroxylated polymer, and both types of acids all at once, preferably at room temperature. The mixture is heated gradually until the desired esterification temperature is reached. The reaction is effected in an inert atmosphere as hereinbefore described.

When preparing the esterified compositions, generally not more than 90 per cent of the hydroxy groups present in the hydroxylated polymer are esterified and frequently not more than 75 per cent of the hydroxy groups are esterified. It is considered desirable that some unreacted hydroxy groups be present in the coating compositions. The amount of esterification is dependent to a large extent upon the amount of acid employed.

The hydroxylated conjugated diolefin polymers employed in the practice of this invention can be prepared by any suitable method. For example, in accordance with one method, hydroxylated polybutadiene is prepared from polybutadiene by reaction with hydrogen peroxide or a compound capable of yielding hydrogen peroxide, with or without a solvent, in the presence of a catalyst such as formic acid. The polybutadiene employed can be prepared by either mass or emulsion polymerization and can range from a liquid to a rubber-like material. Polymers of other conjugated diolefins as well as copolymers of conjugated diolefins with copolymerizable materials are applicable in the preparation of the compositions of this invention so long as such polymers can be hydroxylated. These polymers include butadiene-styrene copolymers as well as other copolymers. The conjugated diolefins which are applicable are preferably those which contains 4 to 6 carbon atoms per molecule and include 1,3-butadiene, isoprene, piperylene, methylpentadiene, 2,3-dimethyl-1,3-butadiene, etc. The polymers prior to hydroxylation range from liquid materials having a viscosity of 100 Saybolt Furol seconds at 100° F. to rubbery polymers having a Mooney value (ML–4) generally not to exceed 100 and preferably not greater than 50. Hydroxylated polymers which are especially applicable have an oxygen content in the range between 1 and 20 per cent by weight and preferably not more than 15 per cent by weight. The hydroxylation of liquid polybutadiene is more fully described in a copending application of Hillyer and Edmonds, Serial No. 204,062, filed January 2, 1951, now Patent No. 2,692,892.

Unsaturated fatty acids which are applicable in the practice of this invention are preferably those containing from 12 to 14 carbon atoms per molecule and include drying oil acids such as linseed oil acids, tung oil acids, oiticica oil acids, corn oil acids, castor oil acids, cottonseed oil acids, perilla oil acids, and soybean oil acids. Typical unsaturated fatty acids include oleic acid, linoleic acid, linolenic acid, etc. The preferred species is linseed oil acids. However, when mixed unsaturated fatty acid-polybasic acid esters are employed in coating compositions for metal surfaces that are to come in contact with foods and beverages, various other drying oil acids can be used and satisfactory coating compositions obtained. The quantity of acid employed is that chemically equivalent to from 5 to 90 per cent of the number of hydroxy groups in the hydroxylated polymer.

Polybasic acids which are suitable include the various polybasic acyclic and cyclic acids such as polybasic aliphatic acids, polybasic aromatic acids, and polybasic cycloaliphatic acids containing 2 to 20 carbon atoms per molecule. Examples of these acids are: phthalic, isophthalic, and terephthalic acids, adipic acid, citric acid, fumaric acid, glutaric acid, maleic acid, malic acid, naphthalic acid, sebacic acid, succinic acid, tartaric acid, etc. Phthalic, maleic, and fumaric acids are generally preferred. Anhydrides of these acids are also applicable. The amount of polybasic acid or anhydride employed is that equivalent to from 1 to 20 per cent, preferably 5 to 13 per cent, of the hydroxy groups in the hydroxylated polymer. The amount of unsaturated fatty acid used therewith is determined, at least in part, by the amount of polybasic acid or anhydride employed. If it is assumed that the polybasic acid will react with a certain number of hydroxy groups, then the quantity of unsaturated fatty acid employed is that which is equivalent to from 1 to 90 per cent of the remaining hydroxy groups in the hydroxylated polymer.

The drying oils which are most frequently preferred are linseed and tung oil. However other drying and semi-drying oils can be employed, particularly when mixed unsaturated fatty acid-polybasic acid esters are used in the coating compositions. Other drying and semi-drying oils include soybean oil, oiticica oil, castor oil, cottonseed oil, and perilla oil. These oils are employed in amounts which range from 10 to 95 per cent by weight of the total mixture. In instances where the hydroxylated polymer is prepared from a highly viscous or rubbery polymer, larger amounts of drying oils are generally employed than in cases where the hydroxylated polymer has a relatively low viscosity. Another factor which governs the amount of drying oil used is the degree of hydroxylation of the polymeric starting material. As the degree of hydroxylation is increased, more drying oil is generally required to insure a homogeneous product. It is to be understood that the compositions herein described can be prepared from single acids or mixtures of various acids and also from a single hydroxylated polymer or a mixture of hydroxylated polymers. Likewise drying oils from a single source or mixtures of drying oils can be employed.

The viscosity of the compositions herein described is generally in the range between Q on the Gardner scale to a point just short of the gel point. The viscosity desired in the composition can also be determined by the amount of thinner that is to be employed.

During the preparation of these compositions, that is, during esterification in the presence of a drying oil, some increase in viscosity, or bodying, generally occurs, particularly if elevated temperatures, such as in the higher portion of the range given for esterification, are used. If the product has a viscosity less than that desired for the purpose for which it is to be used, an additional bodying step may be required. This step comprises heating the mixture at a temperature in the range between 400 and 650° F. until a product of the desired viscosity is obtained. Usually not more than 10 hours is required. The time required is usually dependent upon the molecular weight of the polymeric starting material and the degree of hydroxylation. Bodying occurs at a more rapid rate in some materials than in others. In general, the higher the molecular weight of the hydroxylated polymer, the less the bodying time required; also the higher the degree of hydroxylation, the less the bodying time required.

Subsequent to the bodying step the mixture is cooled and a thinner is added. Conventional thinners for paint and varnish are applicable, i. e., coal tar hydrocarbons, petroleum distillates, turpentine fractions and the like. The amount of thinner employed is generally in the range between 50 and 80 per cent by weight of the total composition.

After the thinner has been mixed with the bodied composition, driers are generally added. Conventional driers, such as lead, cobalt, zinc, and manganese, in the form of the naphthenate salts or other suitable form, are usually employed. These materials are added and the mixture warmed to 200 to 250° F. and agitated to facilitate solution and produce a homogeneous mixture.

The compositions herein described are particularly suitable for coating sheet metal, such as tinned plate, terne plate, bonderized steel, or other thin metal sheets used in making metal containers for storing food, beer, oil, and other products. These compositions are applicable for inside or outside protective coatings or as base coatings for lithographing exterior surfaces of containers or as base coatings for wax-lined beer cans.

The compositions can be applied to metal surfaces by any suitable means such as brushing, spraying, dipping, roller coating, and the like. Following application of the coating composition, the metal is generally baked at a temperature in the range between 200 and 500° F., preferably between 300 and 500° F., for a period in the range between 20 and 90 minutes. Generally the baking period does not exceed 60 minutes.

The following examples are illustrative of the invention and the manner in which it may be practiced.

*Example I*

A sample of liquid polybutadiene prepared by sodium catalyzed polymerization, having a viscosity of 488 Saybolt Furol seconds at 100° F. and a Gardner color of 10, was hydroxylated in chloroform with 20 per cent aqueous hydrogen peroxide in the presence of formic acid. The ratio of these reactants was three $C_4$ equivalents of the liquid polybutadiene per mol of anhydrous hydrogen peroxide per mol of formic acid. The product had an oxygen content of approximately 12 per cent by weight.

Thirty grams (36.9 wt. per cent) of the hydroxylated liquid polybutadiene prepared as described above and 51.3 grams (63.1 wt. per cent) linseed acids were charged to a reactor which had previously been flushed with carbon dioxide. The mixture was stirred and heated to 300° F. and then maintained at that temperature for two hours. The product had an acid number of 95, a Hellige color of 13, and a Gardner viscosity of T.

Twenty grams (30 wt. per cent) of the reaction product of hydroxylated liquid polybutadiene with linseed acids was mixed with 46.6 grams (70 wt. per cent) of linseed oil and the mixture heated at 515° F. for two hours. The resulting varnish composition had an acid number of 19, a Hellige color of 10, and a Gardner viscosity of X. This varnish composition is hereinafter designated as No. 1.

Eleven grams of hydroxylated liquid polybutadiene (11 wt. per cent), 19 grams (19 wt. per cent) of linseed acids, and 70 grams (70 wt. per cent) of linseed oil were charged to a reactor which had been flushed with carbon dioxide. The mixture was stirred and heated at 300° F. for two hours and then at 575° F. for two hours. The resulting varnish composition, hereinafter designated as No. 2, had an acid number of 21, a Hellige color of 10, and a Gardner viscosity of W.

Isopentane was added to each of the varnish compositions, designated as Nos. 1 and 2, to give mixtures containing 37.8 weight per cent of the varnish composition and 62.2 weight per cent isopentane. Each of these varnish formulations was used to coat strips of new, acetone-washed, tinned plate. The strips were then baked in the presence of air for one hour at 390–400° F. The coatings were a light color and adhered to the tinned plate exceptionally well. The coated strips were compared with similar strips which had been covered with a standard commercial coating used for containers for red fruits and vegetables and designated as "R" type varnish. Various tests were made on the coated strips.

The test for heat resistance was made by suspending the strips in boiling water and observing the coated surfaces at intervals. Visual observation and a test of adherence with the finger nail were sufficient to determine the resistance of the varnish.

For the solvent resistance test the strips were immersed in dipentene maintained at 212° F. The time which elapsed before the varnish flaked off was observed.

The effect of the varnish on the taste was tested by immersing the coated strips in water for 12 hours and then observing the taste of the water.

Tests for adherence and mechanical strength comprised scratching with the finger nail, a sharp instrument, and repeated bending of the strip.

The following results were obtained:

| | Varnish | | |
|---|---|---|---|
| | No. 1 | No. 2 | "R" |
| Covering power | Excellent | Excellent | Excellent. |
| Heat resistance | No effect in 16 hours. | No effect in 1 hour.[1] | ([2]) |
| Resistance to dipentene, hours. | 11 | 16 | 2. |
| Surface | Excellent | Excellent | Excellent. |
| Adherence | do | do | Good. |
| Taste | OK | OK | OK. |

[1] Test discontinued after one hour.
[2] After 1–2 hours the coating was soft and easily removed but after continued boiling the film became hard and tough again.

*Example II*

A mixture of 150 grams tung oil and 120 grams hydroxylated polybutadiene was heated at 450° F. for 40 minutes, at which time a skin began to form on the surface. The mixture was cooled to 370° F. and an equal volume of mineral spirits (a hydrocarbon solvent boiling in the range 200–400° F.) added. Cobalt, manganese, and lead linoleates (0.05, 0.05, and 0.15 per cent based on weight of tung oil) had previously been added to the solvent. A piece of tin plate was coated with this composition and baked at 400° F. for 15 minutes. Can-ends fabricated from this tin plate showed no scuffing of the coating and no loss of adhesion was observed.

*Example III*

A mixture of 450 grams of tung oil and 360 grams of hydroxylated polybutadiene was heated for 35 minutes to elevate the temperature to 450° F. and maintained at a temperature of 450–480° F. for 20 minutes at the end of which time a desirable string was reached. The cook was checked by adding 700 grams of solvent (200 grams toluene and 500 grams Stoddard solvent) to which had been added 2.62 grams cobalt linoleate and 2.38 grams of manganese linoleate. The product was satisfactory as a varnish.

Example IV

Sixty-two grams of hydroxylated polybutadiene was heated with 100 grams of linseed acids for four hours at a temperature of 400–420° F. after which 125 grams of tung oil was added. Heating was continued at 420–430° F. The cooking end point as indicated by desirable varnish string was reached in 60 minutes. After cooling to 300° F., an equal volume of mineral spirits containing cobalt, manganese, and lead linoleates as driers (0.05, 0.05, and 0.15 per cent based on tung oil) was added. A piece of tin plate was coated with this varnish and baked for 20 minutes at 400° F. Can-ends were fabricated from the tin plate without scuffing of the varnish or any apparent loss of adhesion of the coating.

Example V

A varnish was prepared by heating 248 grams hydroxylated polybutadiene with 390 grams of linseed acids at 425° F. for four hours, cooling and adding 500 grams of tung oil, and cooking at a temperature between 450 and 480° F. for 35 minutes at which time a satisfactory end point was reached as indicated by the varnish strength. The hot mixture was poured into 1000 grams of a solvent made up from 250 grams of toluene and 750 grams of Stoddard solvent, 2.62 grams of cobalt linoleate and 2.38 grams of manganese linoleate driers being incorporated in the solvent. An adhesion test showed this material to be satisfactory.

Example VI

Six hundred grams of hydroxylated polybutadiene was esterified by heating with 1000 grams of linseed acids at 340° F. for six and one-half hours. About forty-five minutes were required to effect the elevation in temperature. A varnish was prepared by heating 272 grams of the ester as thus prepared with 635 grams of tung oil for fifty minutes at 425–430° F. to reach a satisfactory end point as indicated by the varnish string. Thirty minutes were required for the elevation of the temperature to cooking level. The mix was cooled by addition of 771 grams Stoddard solvent containing 3.68 grams cobalt linoleate and 3.32 grams of manganese linoleate. Tin plate coated with this varnish and baked for 15 minutes was used for fabrication of can-ends. Baking temperature was 400° F. No scuffing or loss of adhesion of the varnish was noted in the fabrication.

Example VII

A varnish was prepared using the same formulation as in the preceding paragraph except that 635 grams of linseed oil was substituted for the tung oil. Preparation of the linseed acid ester of hydroxylated polybutadiene was as described in the preceding example. The esterified hydroxylated polybutadiene and linseed oil were heated for 35 minutes to reach a temperature of 435° F. at which level the temperature was maintained for one hour. The temperature was then elevated to 500° F. and maintained at this level for three hours to reach the end point as indicated by a satisfactory varnish string. The mass was then cooled to 350° F. and the solvent containing the drier added. Application to tin plate was satisfactory with a baking period of 15 minutes at 400° F. An adhesion test showed this material to be satisfactory.

The hydroxylated polybutadiene used in Examples II to VII, inclusive, was a liquid product prepared by hydroxylating the material in a chloroform solvent using 8 parts of chloroform for each part of liquid polybutadiene. The starting material has a viscosity of 386 Saybolt Furol seconds at 100° F. and a Gardner color of 12. The ratio of reactants was three parts liquid polybutadiene to one part hydrogen peroxide and one part formic acid. This hydrogen peroxide was a 20 per cent aqueous solution. Hydroxylation was effected at 50° C.

The Stoddard solvent used as a thinner in Examples III, V, and VI is a colorless refined petroleum product containing substantially no aromatics and which is free of undissolved water and suspended matter. It has a flash point of at least 100° F. and boils in the range of 300 to 410° F.

Using hydroxylated liquid polybutadiene, linseed acids and linseed or tung oil, the preferred ranges by weight based upon the sum of these components are 10 to 25 per cent hydroxylated liquid polybutadiene, 15 to 40 per cent linseed acids and 40 to 75 per cent linseed or drying oil.

As many possible embodiments may be made of this invention without departing from the scope thereof, it is to be understood that all matter herein set forth is to be interpreted as illustrative and not in a limiting sense.

I claim:

1. A metal food and beverage container resistant to food acids, the inner surfaces of which metal container are immediately coated with a coating baked thereon, said coating comprising at least one material selected from the group consisting of polymers of conjugated diolefins, which have been hydroxylated to an oxygen content of 1 to 20 per cent by weight and which contain hydroxyl groups exclusively on pairs of adjacent carbon atoms, esters of said polymers with unsaturated fatty acids containing 12 to 24 carbon atoms per molecule, and mixed esters of said polymers with unsaturated fatty acids containing 12 to 24 carbon atoms and polybasic acids, in admixture with oils of the drying and semi-drying types, thinners, and driers.

2. A metal food and beverage container resistant to food acids, the inner surfaces of which metal container are immediately coated with a coating baked thereon, said coating comprising at least one material selected from the group consisting of esters of polymers of conjugated diolefins which have been hydroxylated to an oxygen content of 1 to 20 per cent by weight and which contain hydroxyl groups exclusively on pairs of adjacent carbon atoms with unsaturated fatty acids containing 12 to 24 carbon atoms per molecule, and mixed esters of said polymers with unsaturated fatty acids containing 12–24 carbon atoms per molecule and polybasic acids, in admixture with oils of the drying and semi-drying types, thinners, and driers.

3. The container of claim 2 in which the acid number of the esterified mixture is less than 20.

4. The container of claim 2 in which from 1 to 90 per cent of the hydroxyl groups are esterified.

5. A metal food and beverage container resistant to food acids, the inner surfaces of which metal container are immediately coated with a coating baked thereon, said coating comprising mixed esters of polymers of conjugated diolefins which have been hydroxylated to an oxygen content of 1 to 20 per cent by weight and which contain hydroxyl groups exclusively on pairs of adjacent carbon atoms with unsaturated fatty acids containing 12 to 24 carbon atoms per molecule and polybasic acids, in admixture with an oil selected from the group consisting of drying and semi-drying oils, thinners and driers.

6. The container of claim 5 in which from 1 to 20 per cent of the hydroxyl groups are esterified with the dibasic acid, and from 1 to 90 per cent of the remaining hydroxyl groups are esterified with an unsaturated fatty acid containing 12 to 24 carbon atoms per molecule.

7. The container of claim 5 in which the polybasic acids are selected from the group consisting of phthalic, isophthalic, terephthalic, adipic, citric, fumaric, glutaric, maleic, malic, naphthalic, sebacic, succinic, and tartaric acids.

8. The container of claim 5 in which the acid number of the esterified mixture is less than 20.

9. A metal food and beverage container resistant to food acids, the inner surfaces of which are immediately coated with a coating baked thereon, said coating containing a material amount of an ester of liquid polybutadiene which has been hydroxylated to an oxygen content of 1 to 20 per cent by weight and which contains hydroxyl groups exclusively on pairs of adjacent carbon atoms and linseed acids, said ester being mixed with linseed oil.

10. The container of claim 9 in which, based upon 100 per cent of these components, the components are present in the following amounts by weight:

| | Percent |
|---|---|
| Hydroxylated liquid polybutadiene | 10 to 25 |
| Linseed acids | 15 to 40 |
| Linseed oil | 40 to 75 |

11. A metal food and beverage container resistant to food acids, the inner surfaces of which are immediately coated with a coating baked thereon, said coating containing a material amount of an ester of liquid polybutadiene which has been hydroxylated to an oxygen content of 1 to 20 per cent by weight and which contains hydroxyl groups exclusively on pairs of adjacent carbon atoms and linseed acids, mineral spirits, and driers.

12. A metal food and beverage container resistant to food acids, the inner surfaces of which are immediately coated with a coating baked thereon, said coating containing a material amount of a heat-treated mixture of polybutadiene which has been hydroxylated to an oxygen content of 1 to 20 per cent by weight and which contains hydroxyl groups exclusively on pairs of adjacent carbon atoms and tung oil, mineral spirits, and driers.

13. A metal food and beverage container resistant to food acids, the inner surfaces of which are immediately coated with a coating baked thereon, said coating containing a material amount of an ester of polybutadiene which has been hydroxylated to an oxygen content of 1 to 20 per cent by weight and which contains hydroxyl groups exclusively on pairs of adjacent carbon atoms with linseed acids, tung oil, thinner, and driers.

14. A metal food and beverage container, the inner surfaces of which are immediately coated with a coating baked thereon, said coating containing at least 10 per cent by weight of an ester of liquid polybutadiene which has been hydroxylated to an oxygen content of 1 to 20 per cent by weight and which contains hydroxyl groups exclusively on pairs of adjacent carbon atoms and linseed acids, together with linseed oil.

15. A metal food and beverage container, the inner surfaces of which are immediately coated with a coating baked thereon, said coating containing at least 10 per cent by weight of an ester of liquid polybutadiene which has been hydroxylated to an oxygen content of 1 to 20 per cent by weight and which contains hydroxyl groups exclusively on pairs of adjacent carbon atoms and an acid selected from the group consisting of drying oil acids and semi-drying oil acids, together with an oil selected from the group consisting of drying oils and semi-drying oils, and thinners and driers.

16. A metal food and beverage container resistant to food acids, the inner surfaces of which are immediately coated with a coating baked thereon, said coating containing a material amount of an ester of a polymer of a conjugated diolefin which has been hydroxylated to an oxygen content of 1 to 20 per cent by weight and which contains hydroxyl groups exclusively on pairs of adjacent carbon atoms and a drying oil acid, said ester being mixed with a drying oil.

17. A metal food and beverage container resistant to food acids, the inner surfaces of which are immediately coated with a coating baked thereon, said coating containing a material amount of an ester of a polymer of a conjugated diolefin which has been hydroxylated to an oxygen content of 1 to 20 per cent by weight and which contains hydroxyl groups exclusively on pairs of adjacent carbon atoms and linseed acids, said ester being mixed with linseed oil.

18. A container suitable for use in storing foods and beverages, at least the inner surfaces of which have been immediately coated with a material selected from the group consisting of polymers of conjugated diolefins which have been hydroxylated to an oxygen content of 1 to 20 per cent by weight and which contain hydroxyl groups exclusively on pairs of adjacent carbon atoms, esters of said polymers with unsaturated fatty acids containing 12 to 24 carbon atoms per molecule, and mixed esters of said polymers with unsaturated fatty acids containing 12 to 24 carbon atoms and polybasic acids.

References Cited in the file of this patent

UNITED STATES PATENTS

| 2,455,722 | Adelson et al. | Dec. 7, 1948 |
| 2,523,609 | Bloch et al. | Sept. 26, 1950 |
| 2,623,890 | Verley | Dec. 30, 1952 |
| 2,692,892 | Hillyer et al. | Oct. 26, 1954 |